March 26, 1935. J. S. ULINSKI 1,995,554
MOTOR
Filed Dec. 12, 1933
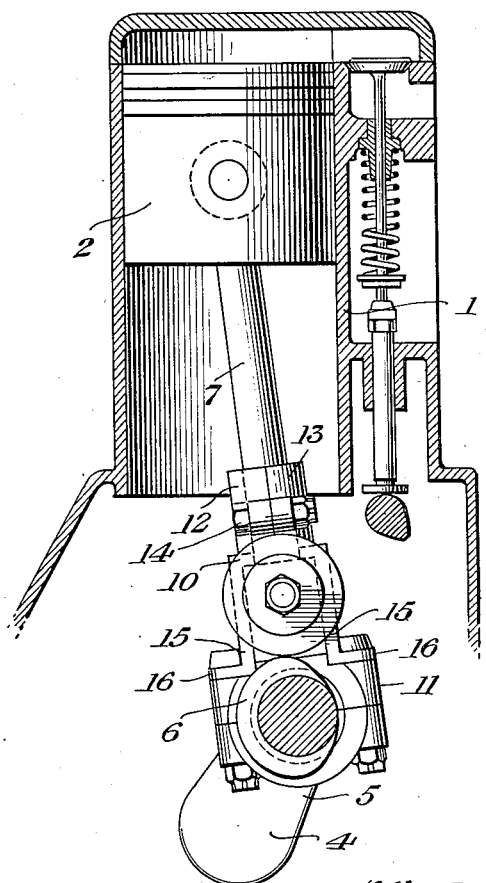
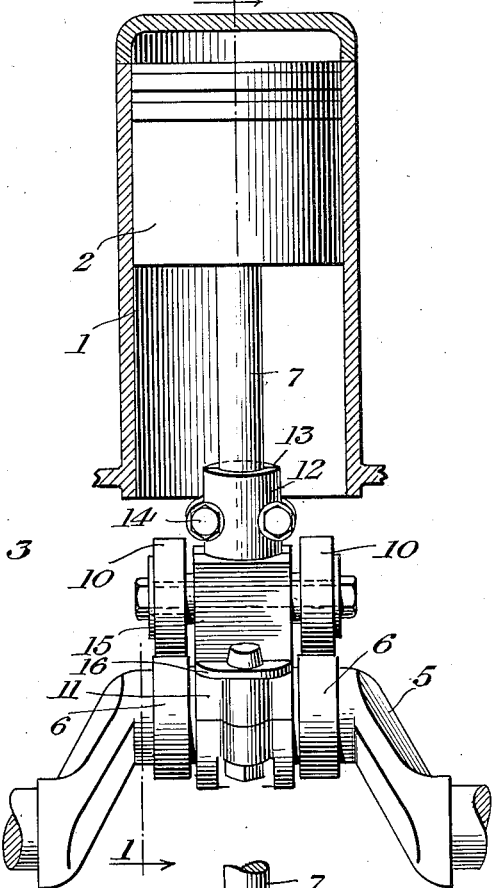
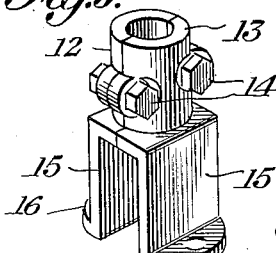
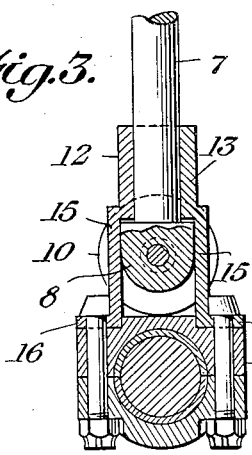
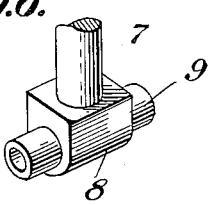
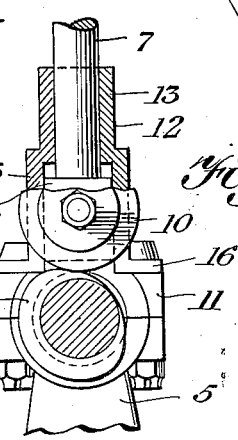
John S. Ulinski
INVENTOR
BY Victor J. Evans and Co. ATTORNEYS Patented Mar. 26, 1935

1,995,554

UNITED STATES PATENT OFFICE 1,995,554

MOTOR

John S. Ulinski, Hamtramck, Mich.

Application December 12, 1933, Serial No. 702,060

1 Claim. (Cl. 74—44)

This invention relates to internal combustion engines and more particularly to an improved construction of connecting rod and crank shaft adaptable to any standard type of reciprocal engine and has for the primary object the provision of a device of the above stated character which will provide greater efficiency, more power for a given amount of fuel with less vibration and with a greater torque and operate at a cooler temperature and consists of a minimum number of parts.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a transverse sectional view taken on the line 1—1 of Figure 2, illustrating an engine equipped with a connecting rod and crank shaft forming the subject matter of the present invention.

Figure 2 is a fragmentary vertical sectional view illustrating my invention.

Figure 3 is a fragmentary sectional view illustrating the connection between the connecting rod and the crank of the crank shaft.

Figure 4 is a fragmentary sectional view showing the rollers of the connecting rod in engagement with the cams of the crank shaft.

Figure 5 is a perspective view illustrating a guide for the connecting rod.

Figure 6 is a fragmentary perspective view illustrating one end of the connecting rod equipped with a pin for supporting the rollers of the connecting rod.

Referring in detail to the drawing, the numeral 1 indicates the cylinder of an internal combustion engine having reciprocally mounted therein a piston 2 and is carried by a base 3 rotatably supporting a crank shaft 4. The crank 5 of the crank shaft at opposite sides of the bearing portion thereof is provided with cams 6. The cams are fixed to the crank and move therewith and have high and low faces.

A connecting rod 7 is connected to the piston 2 in the usual manner and has one end enlarged to form a head 8 to which is connected a pin 9 forming journals at the opposite sides of the head for rollers 10 which ride upon the cams 6. A connecting rod bearing 11 engages the bearing of the crank 5 between the cams 6 and has detachably secured thereto a guide 12, the latter slidably receiving the connecting rod 7. The guide 12 consists of a sleeve-like member 13 composed of companion sections detachably connected by bolts 14 and is formed integrally with spaced plates 15 carrying ears 16 apertured to receive the bolts of the connecting rod bearing 11. The sleeve-like member 13 surrounds the connecting rod with the head 8 of said connecting rod operating between the plates 15 and with the pin projecting beyond said plates to support the rollers outwardly of the guide 12. Thus it will be seen that the connecting rod 7 is capable of having a limited movement relative to the crank 5 of the crank shaft so that the rollers may ride upon the high and low faces of the cams and the latter are so positioned with respect to the crank of the crank shaft and the movement of the piston that the connecting rod will lengthen after the piston travels a given distance away from the crank shaft and towards the firing chamber of the cylinder and will retain this length during the movement of the piston on its working stroke or towards the crank shaft and will shorten in length after the piston reaches the limit of its working stroke. This arrangement permits the crank of the crank shat to pass top dead center when the piston reaches the limit of its compression stroke so that the piston on its working or firing stroke will have greater leverage upon the crank shaft permitting maximum power to be developed from a minimum consumption of fuel and with vibration reduced to a minimum consequently materially increasing the efficiency of the standard type engine when equipped with my invention.

Having described the invention, I claim:

A piston stroke varying device, of a crank shaft provided with a crank, spaced cams mounted to the crank, a split bearing engaging the crank between said cams, a connecting rod guide detachably secured to the bearing and including a sleeve-like member composed of detachably connected sections and parallel spaced plates integral with the sleeve-like member, a connecting rod of a piston slidable in said sleeve-like member and having an enlarged end contacting with and guided by said plates, and rollers journaled to the enlarged end of the connecting rod and engaging the cams outwardly of the plates.

JOHN S. ULINSKI.